United States Patent
Adelmann

(10) Patent No.: US 7,315,505 B2
(45) Date of Patent: Jan. 1, 2008

(54) STORAGE DEVICE HAVING A PROBE WITH PLURAL TIPS

(75) Inventor: Todd C. Adelmann, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 10/619,199

(22) Filed: Jul. 14, 2003

(65) Prior Publication Data

US 2005/0013230 A1    Jan. 20, 2005

(51) Int. Cl.
 *G11B 9/00*    (2006.01)
(52) U.S. Cl. ..................... 369/126; 369/101
(58) Field of Classification Search ............ None
 See application file for complete search history.

(56) References Cited

U.S. PATENT DOCUMENTS

| | | | |
|---|---|---|---|
| 2,981,794 A | 4/1961 | Cuvelier | |
| 5,345,815 A | 9/1994 | Albrecht et al. | |
| 5,412,597 A * | 5/1995 | Miyazaki et al. | 369/126 |
| 5,808,977 A * | 9/1998 | Koyanagi et al. | 369/43 |
| 5,831,961 A * | 11/1998 | Sakai et al. | 369/126 |
| 5,835,477 A | 11/1998 | Binnig et al. | |
| 5,856,967 A | 1/1999 | Mamin et al. | |
| 6,233,206 B1 | 5/2001 | Hamann et al. | |
| 6,252,226 B1 | 6/2001 | Kley | |
| 6,370,107 B1 | 4/2002 | Hosaka et al. | |
| 6,473,361 B1 | 10/2002 | Chen et al. | |
| 6,507,552 B2 * | 1/2003 | Gibson | 369/126 |
| 6,574,130 B2 | 6/2003 | Segal et al. | |
| 6,762,402 B2 | 7/2004 | Choi | |
| 2003/0218960 A1 * | 11/2003 | Albrecht et al. | 369/126 |
| 2004/0113641 A1 | 6/2004 | Birecki | |
| 2005/0013230 A1 | 1/2005 | Adelmann | |
| 2005/0036428 A1 | 2/2005 | Adelmann | |

* cited by examiner

*Primary Examiner*—William Korzuch
*Assistant Examiner*—Tawfik Goma

(57) ABSTRACT

A storage device includes a storage medium and a probe having plural tips. The storage medium has a surface in which storage cells are to be formed. The tips of the probe form plural perturbations in the surface in at least one of the storage cells for representing a data bit.

21 Claims, 3 Drawing Sheets

STORAGE DEVICE HAVING A PROBE WITH PLURAL TIPS

BACKGROUND

In computing systems, such as desktop computers, portable computers, personal digital assistants (PDAs), servers, and others, storage devices are used to store data and program instructions. One type of storage device is a disk-based device, such as magnetic disk drives (e.g., floppy disk drives or hard disk drives) and optical disk drives (e.g., CD or DVD drives). Such disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

One of the issues associated with a probe-based storage device is the reliability of each storage bit. Because the perturbations created to store data bits is based on some alteration of a characteristic in the surface of the storage medium, reliability of successfully generating the perturbations or detecting such perturbations can pose a challenge. For example, when a tip scans over a portion of the storage medium in which a perturbation has been created in the storage medium, the tip may miss the presence of the perturbation. As a result, a read error may occur, which reduces reliability of storage device operation. The push to create these types of devices on the nano-scale and to increase their density makes noise and reliability issues even more challenging.

DETAILED DESCRIPTION

Figure 1:
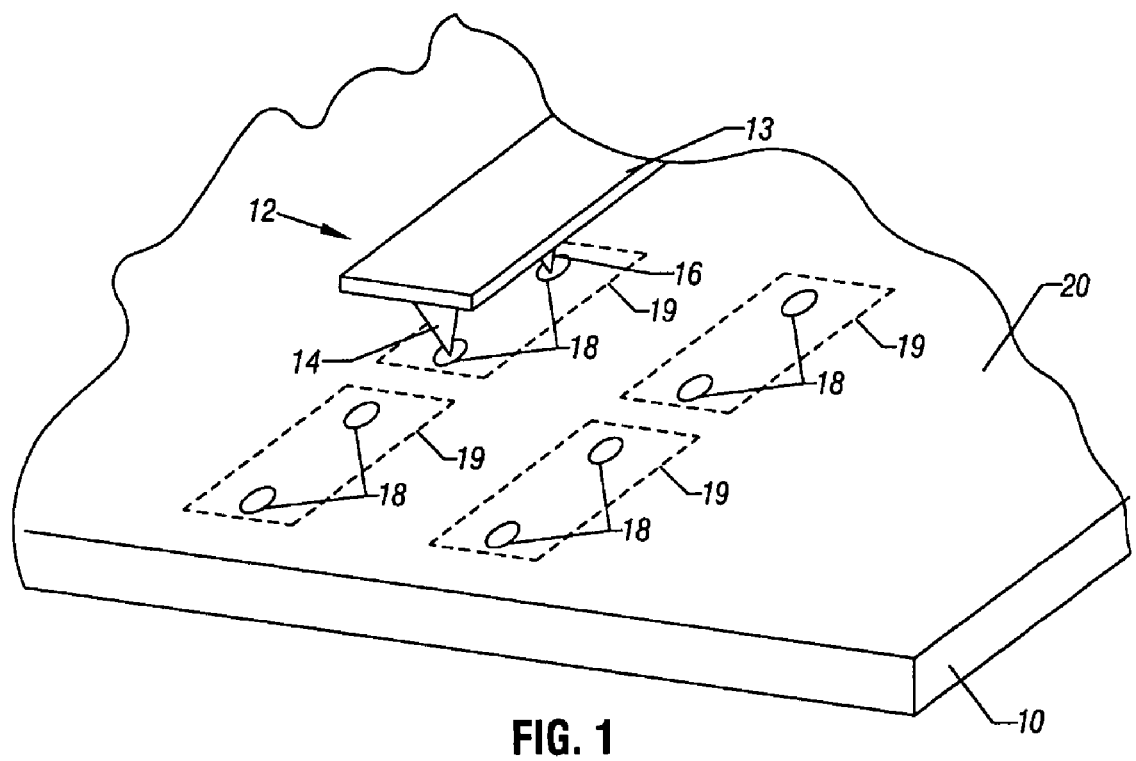
FIG. 1 illustrates a portion of a probe-based storage device that includes a storage substrate defining a storage medium, along with a probe having multiple tips to create redundant perturbations in the storage medium.

FIG. 1 shows an example probe-based storage device that includes a storage substrate 10 that provides a storage medium. The storage medium has a storage surface 20 on which perturbations can be formed by multiple tips 14 and 16 of a probe 12. According to some embodiments, the probe 12 is a very small probe (on the order of micrometers, nanometers, or even smaller) that is built using nanotechnology techniques.

The tips 14 and 16 of the probe 12 are attached to and extend outwardly from a cantilever 13 of the probe 12. Note that in some embodiments, multiple probes (such as an array of probes), each with multiple tips, are provided in the probe-based storage device. In other embodiments, a single probe with multiple tips can be provided in the probe-based storage device. As discussed further below, the probe 12 is formed from a probe substrate that is positioned in a plane that is generally parallel to the storage substrate 10. The probe tips protrude from the main surface of the probe substrate to enable the tips to contact the storage surface 20.

As shown in FIG. 1, perturbations 18 are formed in the surface 20 of the storage medium on the storage substrate 10. In one embodiment, the perturbations 18 are dents, pits, indentations, or markings formed in the surface 20 of the storage medium. In this embodiment, the material providing the surface 20 of the storage medium is formed of a relatively soft material, such as polymer (e.g., PMMA or polymethylmethacrylate). In other embodiments, the material providing the storage surface 20 of the storage medium can be a liquid crystal, a phase change material, or any other suitable material. In one implementation, the layer made of the soft material can be formed over the rest of the storage substrate 10, with the top layer defining the storage surface 20. Alternatively, the entire substrate 10 can be formed of the soft material.

To create the dents 18, the tips 14 and 16 are locally heated to a predetermined temperature (e.g., up to about 400° C.) for some amount of time. The heat from the tips melts the storage surface 20 at the contact points of the tips 14 and 16. When a downward force is applied onto the probe 12, tips 14 and 16 imprint the dents 18. The applied downward force can be an incremental, applied downward force, or alternatively, a constant downward force due to the elastic nature of each cantilever. For example, the device is assembled such that the cantilevers are bent back a little and are always applying some pressure on the storage substrate.

The presence of a dent represents a logical "1," while the absence of a dent represents logical "0." During write operations, use of the multiple tips 14 and 16 causes two redundant dents 18 to be created for each given storage cell 19. In the example of FIG. 1, four storage cells 19 are illustrated, with each storage cell 19 including a pair of redundant dents 18. Note that if dents are not formed in a given storage cell 19, then that represents a logical "0." Alternatively, if two dents are formed in a given storage cell, then the cell represents a logical In other embodiments, to provide even greater redundancy, a probe with more than two tips can be used for generating more than two perturbations in each storage cell. The redundant dents 18 (or other type of perturbation) in each storage cell 19 are spaced apart by a spacing defined by the distance between the probe tips 14 and 16.

Once dents are formed, they can be erased by also using the tips 14 and 16 of the probe 12. During erase, the tips 14 and 16 engage the dents 18, with the tips being heated locally to melt the material surrounding the dents 18 such that the material flows into the dents to remove the dents.

Heating of the tips 14 and 16 can be achieved in one of several ways. For example, an electrical pulse can be sent along a conductor through the cantilever 13 to the tips 14 and 16, which causes the tips 14 and 16 to be heated to the desired temperature. The heating can be achieved by local heating elements such as resistors (which heat up in response to current passing through the resistors). Alternatively, laser beams or other heat sources can be used to perform heating.

Instead of redundant dents formed in a storage cell 19 by the tips 14 and 16 of the probe 12, other types of redundant perturbations can be created in each storage cell 19. Perturbations can include, but are not limited to, the following: creating or altering the composition of the storage medium; altering the crystalline phase of the medium; filling or emptying existing electronic states of the medium; creating or altering domain structures or polarization states in the medium; creating or altering chemical bonds in the medium; employing tunneling effects to move and remove atoms or charge to or from the medium; or storing/removing charge from a particular region.

Figure 2:
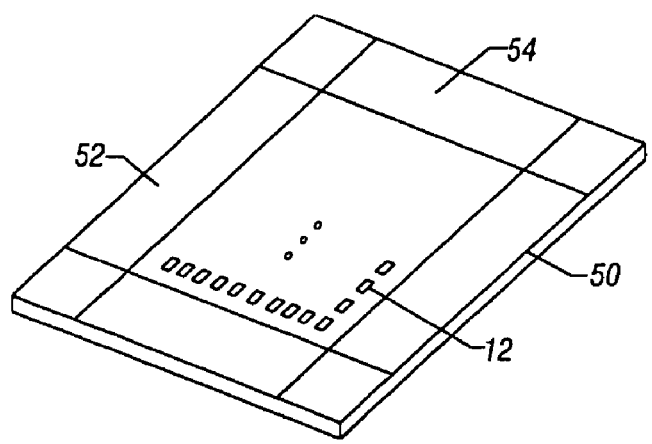
FIG. 2 is a schematic diagram of a probe substrate containing an array of probes and peripheral circuitry to interact with such probes.

FIG. 2 illustrates the probe substrate 50, which includes an array of probes 12 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 12 may be activated by the select lines to read from or write to storage cells that the probes are in contact with. This structure enables concurrent access of multiple cells in one operation, which improves access speeds. Alternatively, one of the probes may be activated to read from or write to a storage cell. The peripheral circuitry 52 and 54 also include sensing devices and decoders to detect analog signals from the probes and to convert the analog signals to a digital representation of a logical "0" or a logical "1."

Figure 3:
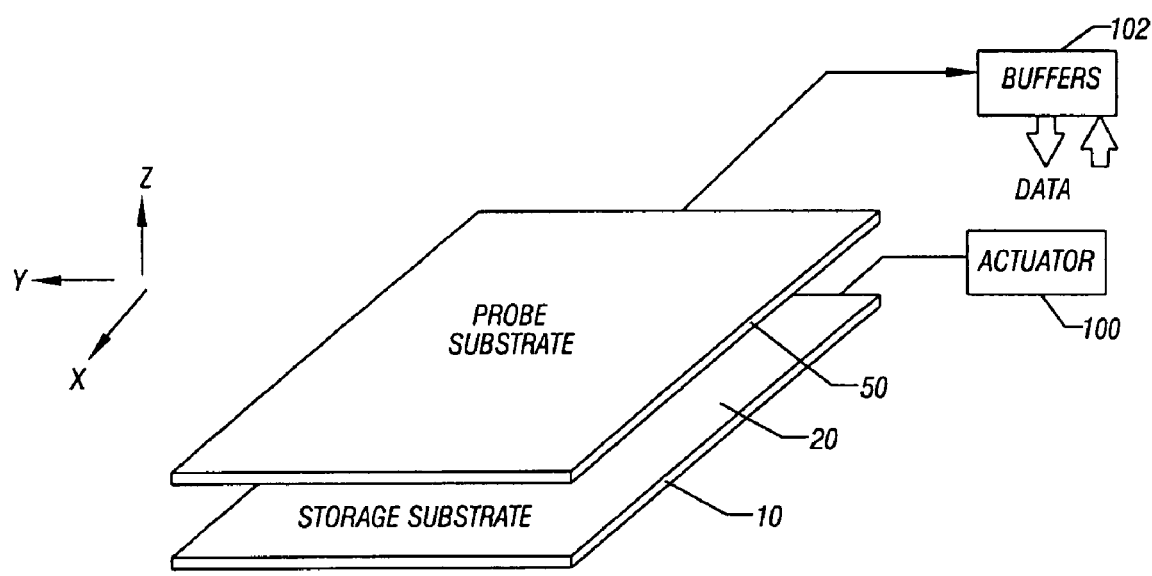
FIG. 3 illustrates the probe substrate positioned to face the storage substrate in the probe-based storage device of FIG. 1.

As shown in FIGS. 1 and 3, the probe substrate 50 is placed with the surface containing the probes 12 facing the storage surface 20 of the storage substrate 10, on which the storage cells are formed. The probe substrate 50 is positioned over the storage substrate 10 so that the probe tips 14 and 16 (FIG. 1) of each probe point downwardly to engage the storage surface 20 of the storage substrate 10. In an alternative arrangement, the storage substrate 10 is positioned over the probe substrate 50 so that the probe tips 14 and 16 point upwardly to face the storage surface 20. In other arrangements, the probe substrate 50 and the storage substrate 10 can be positioned laterally or diagonally.

The storage substrate 10, in the example of FIG. 3, is coupled to an actuator 100 that is designed to move the storage substrate 10 in both X and Y directions such that probes 12 (FIG. 1) can be placed over desired storage cells on the storage substrate 10. Data sensed by the probes 12 is provided to buffers 102, which store output data for retrieval by an external device. The buffers 102 may also store write data to be written to storage cells 19 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 4:
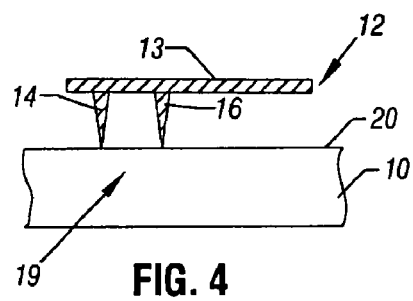
FIG. 4 illustrates the tips of a probe in contact with a surface of the storage medium.
Figure 5:
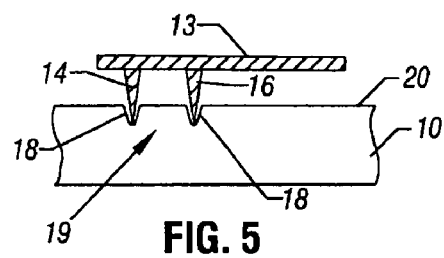
FIG. 5 illustrates creation of redundant perturbations in the surface of the storage medium with the tips of the probe.

FIG. 4 is a side view of the tips 14 and 16 of the probe 12 in contact with the storage surface 20 of the storage substrate 10. This position enables the probe 12 to write to a storage cell 19. As shown in FIG. 5, heating of the tips 14 and 16 and downward pressure applied onto the cantilever 13 of the probe 12 causes dents 18 to be formed in the storage surface 20.

To read from the storage cell 19, the cantilever 13 of the probe 12 is actuated to a slanted position (shown in FIG. 6), such that the cantilever 13 is at a slanted angle (not parallel) with respect to the storage surface 20. At the slanted angle, one tip (14) is in contact with the storage surface 20 of the storage substrate 10. In another implementation, during read operations, both tips 14 and 16 can be in contact with the storage surface 20. The probe 12 is scanned such that the probe 14 is dragged across the storage surface 20. The tip 14 is dragged across both the redundant dents 18 that are part of one storage cell 19. The redundant dents increase the likelihood that the tip 14 will accurately detect presence of at least one of the dents 18 in the storage cell. Therefore, reliability is enhanced and the number of read errors resulting from mis-detection of a dent 18 is reduced.

As the probe tip is dragged across the storage surface 20, the probe tip will deflect into the dent as the tip crosses a dent. Detection of either of the dents in the storage cell 19 is an indication of a logical "1." In one implementation, during a read operation, the probe tip is heated to a temperature that is lower than the write temperature. When the heated probe tip encounters a dent, the probe tip transfers heat to the material of the storage surface 20 and electrical resistance falls. This reduction in electrical resistance is detected by peripheral circuitry 52 and 54 (FIG. 2).

In an alternative implementation, detection of the engagement of the probe tip with the dent is based on measurement of the deflection of the cantilever 13 in response to the probe tip engaging the dent. The detection of the cantilever deflection is performed by a piezoresistive resistor that has a resistance that varies with deflection of the cantilever 13. The piezoresistive resistor can be provided at the fixed base of the cantilever 13. Other methods to detect deflection of the cantilever 13 can be used as well.

Figure 6:
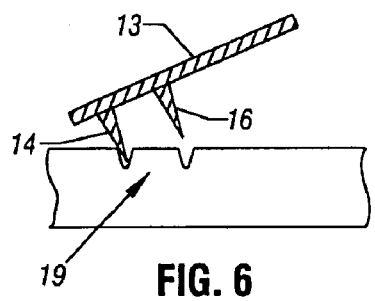
FIG. 6 illustrates the reading of the perturbations created by the probe.
Figure 7:
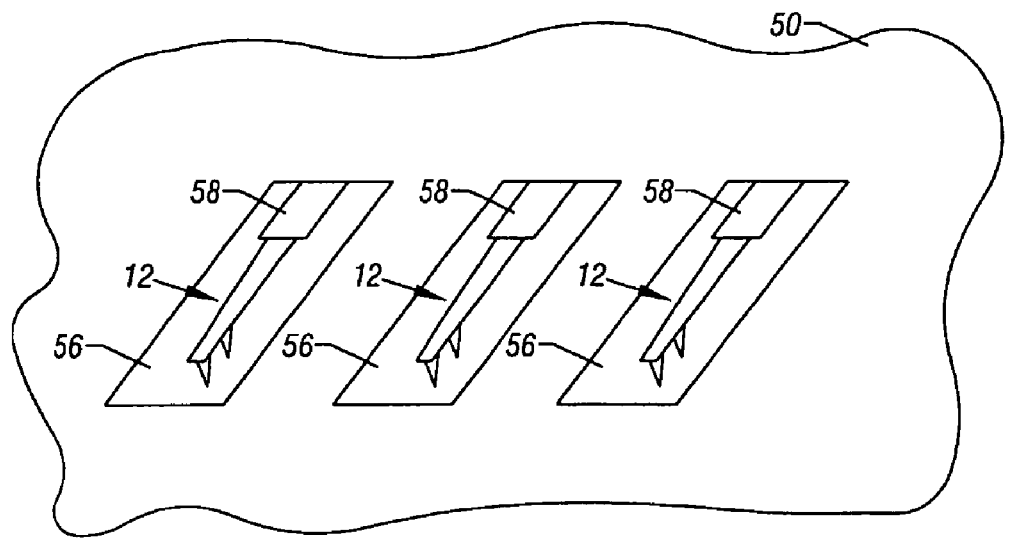
FIG. 7 illustrates several probes formed in the probe substrate.

FIG. 7 shows several probes 12 formed in respective cavities 56 of the probe substrate 50. This embodiment is merely one example of how probes 12 can be formed in the probe substrate 50. Note that, in other embodiments, other techniques for forming probes in the substrate 50 can be employed. Each probe 12 is coupled to a local pivoting actuator 58 so that the probe 12 is pivotably coupled to the probe substrate 50. Alternatively, instead of a pivoting attachment, some type of bending mechanism can be used, such as by use of a piezoresistive element that takes advantage of the inherent flexibility of the cantilever. The pivoting actuator 58 is adapted to pivot the probe 12 with respect to the storage medium surface 20. In one position, the pivoting actuator 58 maintains the cantilever 13 of the probe 12 substantially parallel to the storage medium surface 20 (for performing write or erase operations as shown in FIGS. 4 and 5). In a second position, the pivoting actuator pivots the cantilever 13 such that the cantilever 13 is at a slanted angled with respect to the storage medium surface 20 (as shown in FIG. 6).

In another embodiment, instead of using a local pivoting actuator 58 for each probe, one pivoting actuator can be used for an entire row of probes 12. The pivoting actuator is a microelectromechanical system (MEMS) actuator, which is based on nanotechnology. Very small structures, on the order of nanometers, are formed in the probe substrate 50 to provide the moving parts that make up the pivoting actuator 58. The pivoting actuator 58 can be responsive to input electrical signals. For example, if the input electrical signal is at a first state, the actuator provides a first position of the cantilever 13; on the other hand, if the input signal is at a second state, the actuator 58 provides a second, different position of the cantilever 13.

Figure 8:
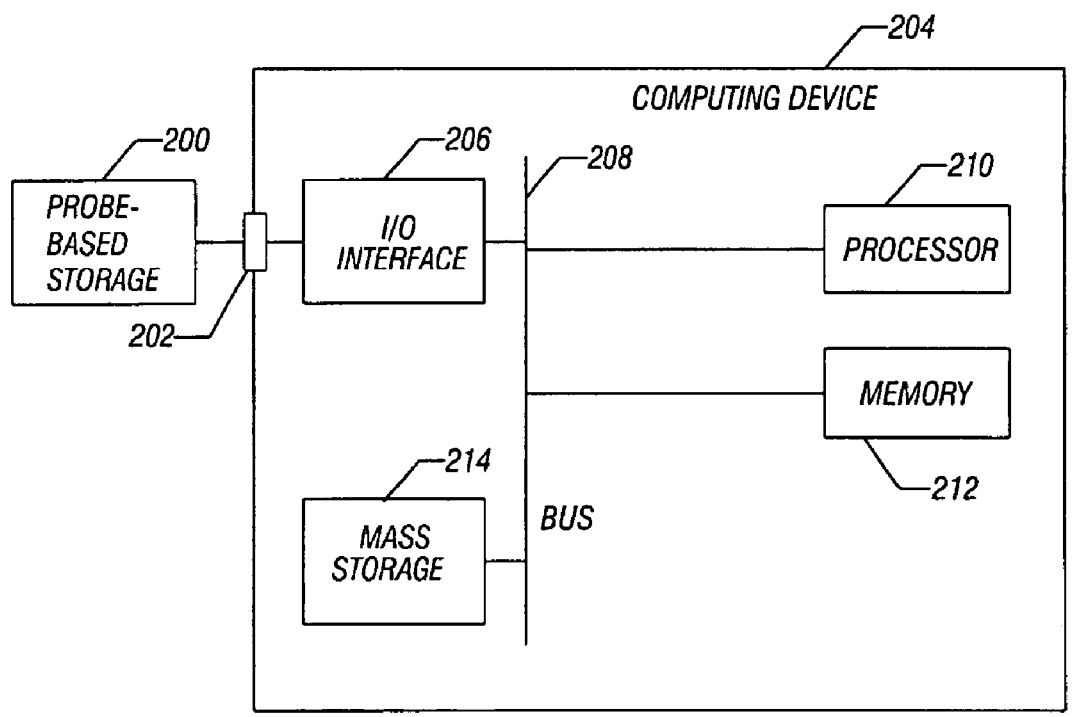
FIG. 8 is a block diagram of a system that includes a computing device having a port to connect to a probe-based storage device.

The probe-based storage device can be packaged for use in a computing system. For example, as shown in FIG. 8, a probe-based storage device 200 that incorporates the multi-tip probe(s) 12 as discussed above is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of the computing system, the probe-based storage device can be mounted onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a probe having plural tips; and
   a storage medium having a surface in which storage cells are to be formed, each storage cell to represent only a single data bit,
   the plural tips of the probe to form plural perturbations in the surface in each of at least one of the storage cells for representing only a single data bit.

2. The storage device of claim 1, wherein the plural perturbations are redundant perturbations for representing the data bit.

3. The storage device of claim 1, wherein the probe comprises a cantilever with the tips attached to and extending outwardly from the cantilever.

4. The storage device of claim 1, wherein the probe is adapted to scan the perturbations of the at least one storage cell with at least one of the tips to detect a state of the data bit as being either a logical "0" or logical "1."

5. The storage device of claim 4, wherein presence of at least one perturbation in a storage cell represents a first state of the data bit, and absence of perturbations in a storage cell represents a second state of the data bit, the storage device further comprising a detector to indicate that the at least one storage cell contains a data bit at the first state in response to the probe detecting at least one of the perturbations.

6. The storage device of claim 1, further comprising a second probe, the second probe having plural tips to form plural perturbations in the surface in another storage cell to represent a second data bit.

7. The storage device of claim 1, wherein the probe is part of an array of probes, each probe in the array of probes having plural tips.

8. The storage device of claim 1, further comprising:
   a substrate in which the probe is formed; and
   an actuator to move at least one of the substrate and the storage medium to adjust relative positions of the substrate and the storage medium.

9. The storage device of claim 8, wherein the probe is adapted to form plural groups of redundant perturbations on the surface of the storage medium to write plural data bits in respective storage cells, and the actuator is adapted to scan the probe over the plural groups of perturbations to read the data bits.

10. The storage device of claim 1, wherein the tips of the probe are in contact with the surface of the storage medium to form the perturbations.

11. The storage device of claim 10, wherein the tips of the probe are heated to form dents in the surface, the perturbations comprising the dents.

12. The storage device of claim 9, wherein fewer than all of the tips of the probe are in contact with the surface of the storage medium to perform a read.

13. The storage device of claim 11, wherein the probe comprises a cantilever to which the tips are attached, the cantilever being actuated to a slanted position to engage the fewer than all of the plural tips of the probe to contact the surface of the storage medium.

14. A system comprising:
   a processor; and
   a storage device coupled to the processor and comprising:
      a probe having plural tips; and
      a storage medium having a surface in which storage cells are to be formed, each storage cell to store only one data bit;
      the plural tips of the probe to form plural perturbations in the surface in each of at least one of the storage cells for representing only a single data bit.

15. The system of claim 14, wherein the probe comprises a cantilever with the tips.

16. The system of claim 14, wherein the probe is adapted to read the two perturbations of the at least one storage cell with at least one of the tips to detect a state of the data bit.

17. The system of claim 14, wherein the probe is part of an array of probes, each probe in the array of probes having plural tips, the storage medium and the array of probes being moveable with respect to each other to read the storage cells.

18. The system of claim 14, wherein the probe is adapted to form plural groups of redundant perturbations on the surface of the storage medium to write plural data bits in respective storage cells, and the actuator is adapted to move the storage medium and the probe with respect to each other to enable the probe to read data bits.

19. A method of storing data in a storage device, comprising:
 providing a probe having plural tips;
 providing a storage medium having a surface to provide storage cells with each storage cell to represent only a single data bit,
 the plural tips of the probe to form plural perturbations in the surface in each of at least one of the storage cells for representing only a single data bit.

20. The method of claim 19, further comprising providing additional probes each having plural tips to form redundant perturbations in respective storage cells.

21. The method of claim 19, further comprising providing an actuator to actuate a cantilever of the probe between a first position in which the plural tips are contacted to the surface, and a second position in which less than all of the plural tips is contacted to the surface.

* * * * *

UNITED STATES PATENT AND TRADEMARK OFFICE
CERTIFICATE OF CORRECTION

PATENT NO. : 7,315,505 B2  Page 1 of 1
APPLICATION NO. : 10/619199
DATED : January 1, 2008
INVENTOR(S) : Todd C. Adelmann It is certified that error appears in the above-identified patent and that said Letters Patent is hereby corrected as shown below:

In column 3, line 8, after "logical" insert -- "1." --.

In column 6, line 52, in Claim 14, after "form" delete "plural" and insert -- at least two --, therefor.

In column 7, lines 9-10, in Claim 19, after "bit" delete ", the plural tips of the probe to form plural" and insert -- ; and forming at least two --, therefor.

Signed and Sealed this

Eighth Day of July, 2008

JON W. DUDAS
*Director of the United States Patent and Trademark Office*